(12) United States Patent
Walpin

(10) Patent No.: US 6,665,897 B2
(45) Date of Patent: Dec. 23, 2003

(54) CROWN BED

(76) Inventor: Lionel A. Walpin, 127 W. Hazel St., Inglewood, CA (US) 90302

( * ) Notice: Subject to any disclaimer, the term of this patent is extended or adjusted under 35 U.S.C. 154(b) by 101 days.

(21) Appl. No.: 09/876,779

(22) Filed: Jun. 6, 2001

(65) Prior Publication Data

US 2002/0184708 A1 Dec. 12, 2002

(51) Int. Cl.$^7$ .............................................. A01K 1/035
(52) U.S. Cl. ...................... 5/420; 5/732; 5/739; 5/740; 5/655.9; 119/285
(58) Field of Search ............................ 119/28.5; 5/420, 5/732, 736, 739, 740, 655.9, 656, 657.5, 655

(56) References Cited

U.S. PATENT DOCUMENTS

| | | | |
|---|---|---|---|
| 3,902,456 A | * 9/1975 | David | 119/28.5 |
| 4,835,801 A | 6/1989 | Walpin et al. | 5/432 |
| 4,850,068 A | 7/1989 | Walpin et al. | 5/432 |
| 4,853,993 A | 8/1989 | Walpin et al. | 5/431 |
| 5,088,139 A | * 2/1992 | Bloom | 190/1 |
| 5,197,411 A | * 3/1993 | Schwarzenbart | 119/28.5 |
| 5,742,911 A | * 4/1998 | Dumbrill et al. | 455/422 |
| 5,765,502 A | * 6/1998 | Haugh | 119/28.5 |
| 5,826,537 A | * 10/1998 | Heilborn | 119/28.5 |
| 6,079,067 A | * 6/2000 | Becker et al. | 5/652 |
| 6,182,312 B1 | 2/2001 | Walpin | 5/636 |
| 6,196,157 B1 | * 3/2001 | Northrop et al. | 119/28.5 |

* cited by examiner

Primary Examiner—Michael F. Trettel

(57) ABSTRACT

A cuddle bed (10) for pet includes a bottom cushion (11) surrounded by a ring (12) having a scalloped upper border (14). High sections (16) of the ring (12) provide posture support for a pet cuddling thereto. The pet can stretch itself over low sections (18) of the ring (12). In addition, the high sections (16) provide a relatively isolated environment to the pet cuddling in the cuddle bed (10) and the low sections (18) provide the pet with easy access to the cuddle bed (10).

18 Claims, 1 Drawing Sheet

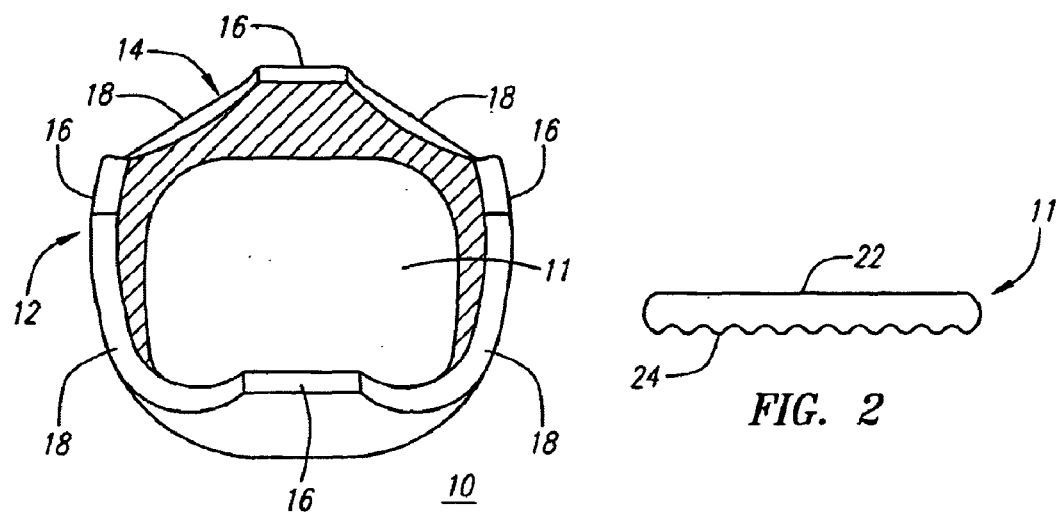
FIG. 1
FIG. 2
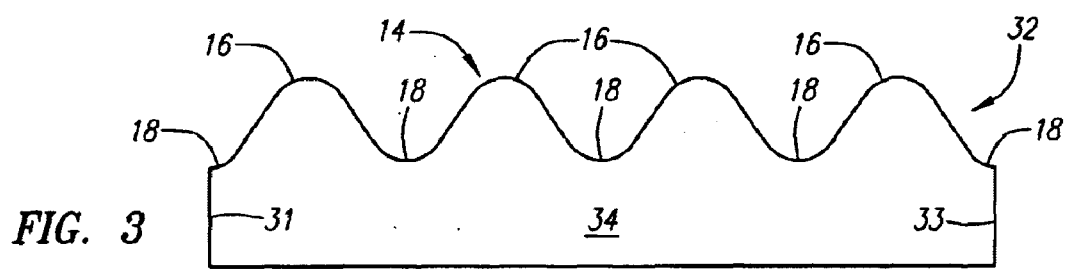
FIG. 3
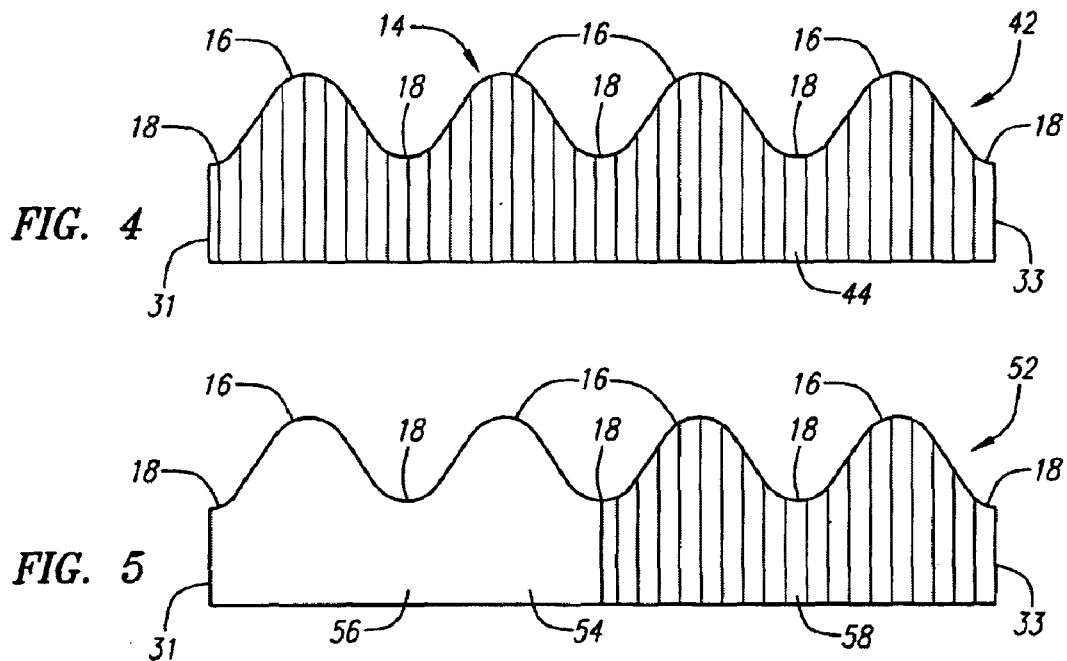
FIG. 4
FIG. 5

CROWN BED

FIELD OF THE INVENTION

The present invention relates generally to pet furniture and specifically to pet sleeping and resting furniture.

BACKGROUND OF THE INVENTION

Pets have become a major part of life for many families. A pet can provide companionship and bring joy to its owner. Pet owners generally like to provide their pets with comfortable living environments. Pet furniture serves to provide not only a comfortable resting environment to pet but also a pleasant decoration to pet owner's home.

A typical pet sleeping and resting furniture or pet bed is generally made of a soft cushion placed on the floor. The cushion provides a soft and warm surface for pet to sleep on. However, the cushion does not provide any lateral support for pet to lean against. A pet may lose hair while scrubbing itself on the cushion. The hair may easily spread to the floor, thereby making the floor dirty and requiring frequent floor cleaning. The cushion may also lack certain aesthetic value as a home decoration.

Another kind of pet sleeping and resting furniture or pet bed includes a round disc shaped cushion enclosed by a sidewall. The sidewall provides a lateral support, against which a pet can lean. Further, the cylindrically shaped pet bed provides the pet with an enclosure, in which the pet has some privacy. However, the sidewall may confine the movement of the pet. For example, a cat or a dog of certain size may have difficulties stretching itself inside the enclosed sidewall of the pet bed. Furthermore, a small cat or dog may have difficulties climbing over the sidewall to get into or out of the pet bed. Climbing over the sidewall may tip the pet bed over and mess up the floor and the room.

Yet another kind of pet sleeping and resting furniture or pet bed includes a bottom and a sidewall attached to a portion of the bottom. This partial sidewall provides lateral support for the pet, and allows the pet to stretch and to get in on out of bed easily. However, the partial sidewall does not provide an enclosed environment to insulate the pet from outside environment. The pet hair on the bottom of the bed can easily spread to the floor.

Accordingly, it would be advantageous to have a pet sleeping and resting furniture that provides comfortable posture support for the pet. It is desirable for the pet furniture to be easily accessible by the pet and to provide a relatively enclosed environment so that the pet in the furniture is less disturbed by the outside environment. It is also desirable if the pet furniture does not confine the movement of the pet. It is further desirable for the pet furniture to be able to prevent spread of pet hair from the furniture to the surrounding area. In addition, it is desirable for the pet furniture to provide some sensory stimulation to the pet and have some therapeutic effects. It would be of further advantage for the pet furniture to be aesthetically pleasant.

SUMMARY OF THE INVENTION

An objective of the present invention is to have a pet sleeping and resting furniture that provides comfortable posture support for the pet. Another objective is have the pet furniture to be easily accessible by the pet and to provide certain privacy so that the pet in the furniture is less disturbed by the outside environment. Yet another objective of the present invention is to have the pet furniture not to confine the movement of the pet. A further objective is to provide the pet furniture that has certain therapeutic effects to the pet. An additional objective is to have the pet furniture to be able to prevent spread of pet hair from the furniture to the surrounding area. A further objective of the present invention is to have the pet furniture to be aesthetically pleasant.

In order to achieve these and other objectives of the present invention, a cuddle bed for pet is provided. The cuddle bed includes a bottom cushion surrounded by a ring that has a scalloped upper border. High sections of the ring provide posture support and "privacy" for a pet cuddling thereto. The pet can stretch itself over low sections of the ring. In addition, the low sections provide the pet with easy access to the cuddle bed. The pet can either snuggle up to the high sections of the ring or rest near the center of the bottom cushion away from the ring. The pet can also place its back paws and/or front paws over the scallops for stretching or comfort. The pet can easily look out of the circle and project the head beyond the ring. In accordance with a preferred embodiment, at least some high sections in the ring have a convolute surface for sensory stimulation of the pet.

BRIEF DESCRIPTION OF THE DRAWINGS

FIG. 1 is a perspective view of a pet furniture in accordance with the present invention;

FIG. 2 illustrates a bottom pad in the pet furniture of FIG. 1 in accordance with a preferred embodiment of the present invention;

FIG. 3 illustrates a scallop band that forms a ring in the pet furniture of FIG. 1 in accordance with a preferred embodiment of the present invention;

FIG. 4 illustrates a scallop band that forms a ring in the pet furniture of FIG. 1 in accordance with another preferred embodiment of the present invention; and FIG. 5 illustrates a scallop band that forms a ring in the pet furniture of FIG. 1 in accordance with yet another preferred embodiment of the present invention.

DETAILED DESCRIPTION OF THE PREFERRED EMBODIMENTS

Preferred embodiments of the present invention are be described hereinafter with reference to the drawings, in which elements of similar structures or functions are represented by like reference labels.

FIG. 1 is a perspective view of a pet furniture 10 in accordance with a preferred embodiment of the present invention. Pet furniture 10 is also referred to as a cuddle bed or a snuggle bed. Cuddle bed 10 includes a round disc shaped bottom 11 and a ring 12 substantially perpendicular to bottom 11. In use, bottom 11 is placed adjacent to the bottom of ring 12. Ring 12 has a wave shaped upper edge 14 that is also referred to as a scalloped upper border. By way of example as shown in FIG. 1, ring 12 has four high sections 16 and four low sections 18 arranged in an alternating pattern. Each high section 16 is adjacent to and between two corresponding low sections 18. Likewise, each low section 18 is adjacent to and between two corresponding high sections 16.

The size of bottom 11 in cuddle bed 10 can have a wide range. For a small pet such as, for example, a hamster, a small kitten, or a small puppy, the diameter of bottom 11 is preferably between approximately 5 centimeters (cm) and approximately 30 cm. For a medium or large size cat or dog, the diameter of bottom 11 preferably ranges from approximately 30 cm to approximately 150 cm. In a preferred embodiment, cuddle bed 10 is designed for a cat and bottom 11 has a diameter of approximately 40 cm. In order to achieve high space efficiency, bottom 11 may have an elliptical shape for large dogs. Similarly, the heights of high sections 16 and low sections 18 in ring 12 can also vary over wide ranges in order to satisfy various needs and preferences of the pet owners. For a small pet, high sections 16 are preferably between approximately 5 cm and approximately 20 cm in height, and low sections 18 are preferably between approximately 2 cm and approximately 8 cm in height. For a medium size or large size pet, high sections 16 are preferably between approximately 10 cm and approximately 50 cm in height, and low sections 18 are preferably between approximately 5 cm and approximately 15 cm in height.

In a preferred embodiment, bottom 11 and ring 12 are made of foam materials for cost and weight efficiency. By way of example, the foams in bottom 11 and ring 12 have a thickness between approximately 1 cm and approximately 8 cm. In a preferred embodiment, bottom 11 and ring 12 is approximately 5 cm thick. Bottom 11 and ring 12 can either use the same type of foam material or use foam materials of different levels of firmness. For example, bottom 11 can be made of a soft foam material to increase the comfort of the pet lying thereon, and ring 12 can be made of a firm foam material to form a rigid and preferably flexible ring structure. In an alternative preferred embodiment, bottom 11 includes a soft foam material over a firm material. The soft foam provides the pet with a soft and comfortable touch, and the firm underlying material provides a rigid support structure for cuddle bed 10. Similarly, ring 12 can be made of soft materials overlying firm materials. In one embodiment, the inner surface of ring 12, on which a pet can lean while in cuddle bed 10, is covered a soft material, whereas the outer surface of ring 12 is covered with a hard material, e.g., plastic, that is easy to clean. In another embodiment, bottom 11 and ring 12 are covered with a fabric, e.g., velvet, that is preferably soft to touch. Other desirable properties for the fabric include hypoallergenic or antiallergenic, durable, water repellent or water resistant, light in weight, easy to clean, low in cost, etc.

FIG. 2 is a side view bottom 11 in accordance with a preferred embodiment of the present invention. Bottom 11 is preferably made of a foam material that has a flat front surface 22 and a convolute back surface 24. Cuddle bed 10 can be formed with flat surface 22 of bottom 11 facing either up or down. In a configuration with flat surface 22 facing up, cuddle bed 10 provides a flat and smooth surface, on which a pet can rest. In an alternative configuration with convolute surface 24 facing up, cuddle bed 10 provides sensory stimulation, which may enhance the comfort and be therapeutic to a pet resting on bottom 11.

In an alternative embodiment, front surface 22 is divided into several areas, each area having a surface texture and/or firmness different from those of other areas. Likewise, back surface 24 can also be divided into several areas with each area having a surface texture and/or firmness different from those of other areas. In such an embodiment, a pet can select to rest on different areas of bottom 11 for different levels sensory stimulation, thereby maximizing the therapeutic functions and comfort of cuddle bed 10.

Referring back to FIG. 1, ring 12 encloses bottom 11, thereby providing an enclosed environment in cuddle bed 10. The enclosure of bottom 11 by ring 12 provides a relatively isolated environment in cuddle bed 10, thereby providing a pet in cuddle bed 10 behind high section 16 with some "privacy" and insulating the pet from disturbance of the surrounding environment. Ring 12 also prevents the pet hair or other debris in cuddle bed 10 from spreading to the floor surrounding cuddle bed 10, thereby lightening the cleaning chores for pet owners.

Scalloped upper border 14 of ring 12 provides easy access of cuddle bed 10. Specifically, a pet, even a small kitten or a small puppy, and easily climb into cuddle bed 10 through one of low sections 18 in ring 12. Cuddle bed 10 is unlikely to tip over when a pet of any size or weight climbs over low sections 18 of ring 12. A pet, regardless of its size, can comfortably stretch itself in cuddle bed 10. Specifically, a large size pet can put its front paws and/or rear paws over low sections 18 of ring 12 to stretch itself. If preferred, a pet can place its paws over high sections 16 while stretching itself. High section 16 in ring 12 of cuddle bed 10 provides lateral and posture support to pets in cuddle bed 10. A pet can cuddle or snuggle against high section 16 in ring 12. Wave shaped border 14 also increases the aesthetic value of cuddle bed 10.

FIG. 3 illustrates a scallop band 32 in accordance with a preferred embodiment of the present invention. Scallop band 32 has two ends 31 and 33, and a wave shaped upper edge or scalloped upper border 14 between ends 31 and 33. As shown in FIG. 3, scallop band 32 has four high sections 16 and four low sections 18 arranged in an alternating pattern. Scallop band 32 is preferably made of a flexible foam material. A major surface 34 of scallop band 32 is preferably smooth.

Scallop band 32 is used to form scalloped ring 12 of cuddle bed 10 shown in FIG. 1. To form scalloped ring 12, scallop band 32 is placed in a fabric cover (not shown) that preferably has substantially the same shape and dimension as scallop band 32. Scallop band 32 is then bent into a ring so that ends 31 and 33 meet each other and major surface 34 becomes the inner surface of ring 12. Fasteners (not shown) such as, for example, strings, zippers, VELCRO™ strips, buttons, snaps, eye hooks, etc., attached to the fabric cover can be used to secure ends 31 and 33 together. Alternatively, ends 31 and 33 can be sewed or glued together. An elastic band or string can also be used to bend scallop band 32 into scalloped ring 12 around bottom 11 to form cuddle bed 10 shown in FIG. 1. It should be noted that the fabric cover is optional in accordance with the present invention. Major surface 34 of scallop band 32 provides a smooth and soft contact to a pet cuddled to ring 12 of cuddle bed 10.

FIG. 4 illustrates a scallop band 42 in accordance with another preferred embodiment of the present invention. Like scallop band 32 shown in FIG. 3, scallop band 42 has two ends 31 and 33, and a wave shaped or scalloped upper border 14 between ends 31 and 33. By way of example, scallop band 42 also has four high sections 16 and four low sections 18 arranged in an alternating pattern. Scallop band 42 is preferably made of a flexible foam material. A major surface 44 of scallop band 42 has convolute texture.

Like scallop band 32 shown in FIG. 3, scallop band 42 is used to form scalloped ring 12 of cuddle bed 10 shown in FIG. 1. Preferably, convolute major surface 44 becomes the inner surface of ring 12 when scallop band 42 is bent into ring 12. Convolute inner surface 44 of ring 12 provides sensory stimulation to a pet resting on bottom 11 and cuddled to ring 12 of cuddle bed 10. Scallop band 42 can also be bent into ring 12 in an opposite direction so that convolute major surface 44 becomes the outer surface of ring 12. In this configuration, a pet cuddled to ring 12 of cuddle bed 10 is in contact with a major surface of scallop band 42 opposite to convolute major surface 44. The texture of that major surface is preferably different from that of major surface 44, so that cuddle bed 10 may provide different levels of sensory stimulation and therapeutic effects to the pet in different configurations.

FIG. 5 illustrates a scallop band 52 in accordance with yet another preferred embodiment of the present invention. Like scallop band 32 shown in FIG. 3 and scallop band 42 shown in FIG. 4, scallop band 52 has two ends 31 and 33, and a wave shaped or scalloped upper border 14 between ends 31 and 33. By way of example, scallop band 52 also has four high sections 16 and four low sections 18 arranged in an alternating pattern. Scallop band 52 is preferably made of a flexible foam material. A major surface 54 of scallop band 52 has multiple textures. By way of example, as shown in FIG. 5, major surface 54 in a portion 56 of scallop band 52 is flat and smooth, and major surface 54 in another portion 58 of scallop band 52 is convolute. Preferably, flat portion 56 and convolute portion 58 meet each other within the boundary of one of low sections 18 of scallop band 52, so that each of high sections 16 is either complete flat of completely convolute.

Like scallop bands 32 and 42 shown in FIGS. 3 and 4, respectively, scallop band 52 is used to form ring 12 of cuddle bed 10 shown in FIG. 1. Preferably, major surface 54 becomes the inner surface of ring 12 when scallop band 52 is bent into ring 12. Different potions of ring 12 have different textures and provide different levels of sensory stimulation to a pet cuddled to ring 12 of cuddle bed 10. A pet can cuddle to different portions of ring 12 for different types or levels of sensory stimulation and seek the most comfortable and desirable positions in cuddle bed 10. Scallop band 52 can also be bent into ring 12 in an opposite direction so that major surface 54 becomes the outer surface of ring 12. In this configuration, a pet cuddled to ring 12 of cuddle bed 10 is in contact with a major surface of scallop band 52 opposite to major surface 54. The textures of that opposite major surface is preferably different from those of major surface 54, so that cuddle bed 10 may provide different sensory stimulation and therapeutic effects to the pet in different configurations.

In accordance with another preferred embodiment of the present invention, scallop band 52 is divided into more than two portions (not shown) with major surface 54 in each portion having a different texture from those in other portions. Preferably, two portions having different textures meet each other only in one of low sections 18. Thus, each of high sections 16 in scallop band 52 provides an undifferentiated sensory stimulation to a pet snuggled thereto. In such an embodiment, cuddle bed 10 provides multiple level of sensory stimulation to a pet resting therein.

By now, it should be appreciated that a pet sleeping and resting furniture has been provided. A pet furniture in accordance with the present invention includes a bottom and a scalloped ring surrounding the bottom. The high sections in the scalloped ring provide the pet with comfortable posture support. The low sections in the scalloped ring allow the pet to stretch itself and get in and out of the furniture easily. The high sections also isolate the pet lying there behind from surrounding environment. The ring prevents the spread of pet hair from the furniture. The surface texture of the pet furniture may provide sensory stimulation to the pet, thereby enhancing the comfort and therapeutic effects of the furniture. In addition, the pet furniture in accordance with the present invention is aesthetically pleasant and can serve as a home decoration for he pet owners.

While specific embodiments of the present invention have be described herein with reference to the drawings, they are not intended as limitations on the scope of the present invention. Various improvements and modifications to the disclosed embodiments are obvious to those skilled in the art and within the scope of the present invention, which should be determined by reference to the pending claims. For example, the scalloped ring of the pet furniture is not limited to having four high sections and four low sections. The different high sections in the scalloped ring of the pet furniture are not limited to having the same shape and width. Further, the bottom of the pet furniture is not limited to being round. The bottom can have other shapes such as, for example, elliptical, oval, etc. In addition, although FIGS. 3, 4, and 5 show ends 31 and 33 falling in low sections 18 of respective scallop bands 32, 42, and 52, this not intended as a limitation of the present invention. Ends 31 and 33 may fall in anywhere in respective scallop bands 32, 42, and 52 relative to high sections 16 and low sections 18.

What is claimed is:

1. An apparatus, comprising:
    a bottom capable of being used as a sleeping area; and
    a ring secured to an edge of said bottom, said ring having a plurality of high sections and a plurality of low sections arranged in an alternating pattern, said ring having a wave shaped upper border;
    wherein, said plurality of high sections is used to provide lateral support for a user and, said plurality of low sections configured for allowing said user to stretch and to get in and out of said apparatus.

2. The apparatus of claim 1, said ring including a foam band bent into said ring, wherein said foam band has a flat major surface.

3. The apparatus of claim 1, further comprising a fabric cover covering said bottom and said ring.

4. The apparatus of claim 1, said ring includes a flat foam band.

5. The apparatus of claim 1, wherein said ring comprises a first portion having a first texture and a second portion having a second texture.

6. An apparatus, comprising:
    a bottom capable of being used as a sleeping area; and
    a ring surrounding said bottom and having a border;
    wherein, said ring has a plurality of high sections for providing lateral support for a user and a plurality of low sections, each of said plurality of low sections configured for allowing said user to stretch and to get in and out of said apparatus, and each of said plurality of low sections being adjacent to two of said plurality of high sections, said ring including four high sections and four low sections.

7. The apparatus of claim 3, wherein
    one of said plurality of high sections has a height between approximately five centimeters and approximately fifty centimeters; and
    one of said plurality of low sections has a height less than the height of the one of said plurality of high sections and between approximately two centimeters and approximately fifteen centimeters.

8. An apparatus, comprising:
    a bottom capable of being used as a sleeping area; and
    a ring surrounding said bottom and having a border;
    wherein, said ring is used to provide lateral support for a user, said border allows said user to stretch and to get in and out of said apparatus, and said ring including a foam band bent into said ring, said foam band has a convoluted major surface.

9. An apparatus, comprising:

a bottom capable of being used as a sleeping area; and a ring surrounding said bottom and having a border, said ring has a plurality of high sections for providing lateral support for a user and a plurality of low sections, each of said plurality of low sections configured for allowing said user to stretch and to get in and out of said apparatus, and each of said plurality of low sections being adjacent to two of said plurality of high sections, said ring including a foam band bent into said ring;

wherein, a first portion of said foam band including at least one of said plurality of high sections and having a flat surface and a second portion of said foam band including at least another one of said plurality of high sections and having a convoluted surface.

10. The apparatus of claim 9, wherein:

said foam band includes at least two low sections; and said first portion and said second portion of said foam band meet each other in said at least two low sections.

11. An apparatus, comprising:

a bottom capable of being used as a sleeping area, said bottom having a flat surface and a convoluted surface opposite to said flat surface; and a ring surrounding said bottom and having a border;

wherein, said ring is used to provide lateral support for a user, said ring has a plurality of first sections and a plurality of second sections that are lower than said first sections, each of said plurality of second sections configured for allowing said user to stretch and to get in and out of said apparatus.

12. An apparatus, comprising:

a bottom capable of being used as a sleeping area; and a ring secured to an edge of said bottom, said ring having a plurality of high sections and a plurality of low sections arranged in an alternating pattern, said ring includes a convoluted foam band;

wherein, said plurality of high sections is used to provide lateral support for a user and, said plurality of low sections configured for allowing said user to stretch and to get in and out of said apparatus.

13. An apparatus, comprising:

a bottom capable of being used as a sleeping area; and a ring secured to an edge of said bottom, said ring having a plurality of high sections and a plurality of low sections arranged in an alternating pattern, a first portion of said ring including at least one of said plurality of high sections and having a flat surface; and a second portion of said ring including at least another one of said plurality of high sections and having a convoluted surface;

wherein, said plurality of high sections is used to provide lateral support for a user and, said plurality of low sections configured for allowing said user to stretch and to get in and out of said apparatus.

14. An apparatus, comprising:

a foam pad bottom capable of being used as a sleeping area, said foam pad bottom having a flat surface and a convoluted surface opposite to said flat surface; and a ring surrounding said foam pad bottom and having at least two high sections and said at least two low sections forming a border of said ring;

wherein, said at least two high sections are used to provide lateral support for a user and, said at least two low sections allow said user to stretch and to get in and out of said apparatus.

15. The apparatus of claim 14, wherein:

a first portion of said ring has a flat surface; and a second portion of said ring has a convoluted surface.

16. The apparatus of claim 15, wherein said first portion and said second portion of said ring meet each other in a low section of said border.

17. The apparatus of claim 14, wherein said foam pad bottom has a thickness between approximately two centimeters and approximately six centimeter.

18. The apparatus of claim 14, further comprising a fabric cover covering said bottom and said ring.

* * * * *